United States Patent [19]

Hayasaka et al.

[11] 4,246,445
[45] Jan. 20, 1981

[54] SYSTEM FOR CONTROLLING THE TRANSMISSION OF SPECIFIC DIAL NUMBERS

[75] Inventors: Toshiaki Hayasaka, Tokyo; Yoshio Shinoda; Masatoshi Terasawa, both of Yokohama, all of Japan

[73] Assignee: Tamura Electric Works, Ltd., Tokyo, Japan

[21] Appl. No.: 15,790

[22] Filed: Feb. 27, 1979

Related U.S. Application Data

[63] Continuation of Ser. No. 861,867, Dec. 19, 1977.

[30] Foreign Application Priority Data

Dec. 28, 1976 [JP] Japan ................................ 51/159782

[51] Int. Cl.$^3$ .............................................. H04M 1/66
[52] U.S. Cl. ............................................... 179/18 DA
[58] Field of Search ................................... 179/18 DA

[56] References Cited

U.S. PATENT DOCUMENTS

| 3,798,381 | 3/1974 | Piacente et al. | 179/18 DA |
| 3,899,640 | 8/1975 | Piacente et al. | 179/18 DA |

*Primary Examiner*—Thomas W. Brown
*Attorney, Agent, or Firm*—Charles E. Pfund

[57] ABSTRACT

A control system is disclosed wherein the dialing of a specific number as the first digit is prevented. The system comprises a dial tone detector which detects a dial tone sent from a telephone exchange to a telephone set when a call is originated from the telephone set by off-hooking its handset, a dial pulse counter for sequentially counting the number of the dial pulses detected by the dial pulse detector, and circuitry responsive to signals from the dial tone detector and dial pulse counter for interrupting the loop if a number is dialed before reception of a dial tone. Additionally, when the output of the counter corresponds to the forbidden number, a talking or speech interruption control unit is operated to interrupt the talking or speech loop.

9 Claims, 3 Drawing Figures

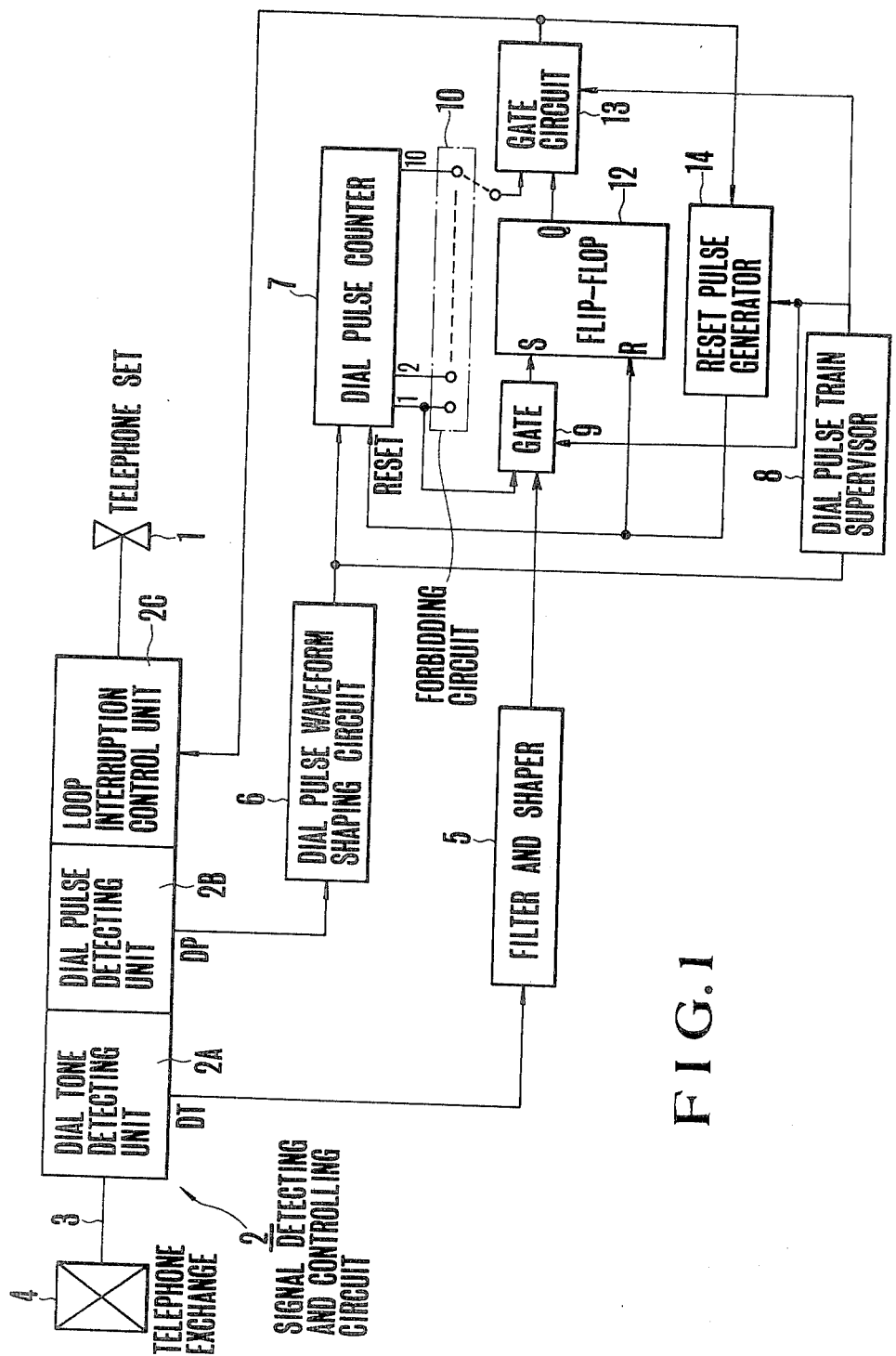
F I G. 1

SYSTEM FOR CONTROLLING THE TRANSMISSION OF SPECIFIC DIAL NUMBERS

This is a continuation of application Ser. No. 861,867 filed Dec. 19, 1977.

BACKGROUND OF THE INVENTION

This invention relates to a system for preventing the transmission of a specific first-dialed number in which a specific talking is controlled by a dial number generated by the operation of the dial of a telephone set, and more particularly to a system of controlling the transmission of a specific dial number for positively preventing unauthorized making of a toll call, for example.

In one prior art system for controlling the transmission of a specific number or digit of a dial which is generated by the dialing operation of a telephone set, an additional mechanism is provided for the dial and when a digit "0" of the dial is firstly rotated for the purpose of making a toll call, the telephone is controlled by the additional mechanism. Such system is disclosed, for example, in U.S. Pat. No. 3,761,639. In this system, however, since the control operation of the transmission of all dial numbers is made on the side of the telephone set, there are the following problems. More particularly, in a usual telephone system when a subscriber off-hooks the handset of his telephone set for the purpose of producing an origination, after confirming the off-hooking of the handset, the telephone exchange transmits a dial pulse transmission OK signal or dial tone to the originating telephone set. After receiving the dial tone the subscriber manipulates his dial for transmitting a specific dial number. In this case, there is a time difference of about 500 ms between the time at which a dial tone signal is sent to the telephone set, and the time at which reception the dial number sent from the subscriber is registered in the transmission register in the telephone exchange after the origination has been confirmed thereby. In correct dialing, the originator should operate his dial after receiving the dial tone signal; but when the originator operates his dial without receiving the signal, the number of dial digits received by the telephone exchange and the number of the dial digits produced by the originator will not coincide with each other, thus resulting in incorrect dialing. If such condition were improperly used, the originator could transmit a specific number which is forbidden. Assume now that the numeral "0" is the specific number which is forbidden and that the other numerals can be transmitted by the first dialing operation. Considering the improper transmission of the forbidden digit, if the number "1", for example, is dialed during an interval between the off-hooking of the handset and the arrival of the dial tone signal from the telephone exchange, transmission of all other dial digits would no longer be prevented since the number "1" is the first dialed digit. Under these conditions, the telephone exchange would not receive the number "1". Then, if the number "0" is dialed for the purpose of making a toll call, the dial mechanism would not operate to prevent the forbidden number from being dialed since it is the second rotation of the dial. Accordingly, the telephone exchange transmits the digits starting from "0". Thus, such a mechanism does not serve to prevent the transmission of the number "0".

As described above, it is extremely difficult to prevent improper operation where the transmission of a specific dial number is precluded and an effective solution of this problem has been desired for a long time, yet no effective solution has been made.

SUMMARY OF THE INVENTION

Accordingly, it is the principal object of this invention to provide a system of controlling the transmission of a specific dial number in which the operation of the telephone exchange and the dialing operation of a telephone set are correlated so as to positively prevent at the telephone exchange the transmission of a specific dial number which is forbidden.

Another object of this invention is to provide a system for controlling the transmission of a specific dial number in which a talking or speech loop is interrupted when a dial pulse is detected before receiving a dial tone signal from a telephone exchange.

Still another object of this invention is to provide a system for controlling the transmission of a specific dial number capable of positively preventing the improper making of a forbidden toll call, for example.

According to this invention, these and further objects can be accomplished by providing a system for controlling the transmission of a specific dial number, comprising a telephone set provided with a dial, a telephone exchange, circuitry for detecting a dial tone which is sent to the telephone set from the telephone exchange in response to the originating operation of the telephone set, circuitry for detecting a dial pulse which is generated when the dial of the telephone set is operated, circuitry for counting the number of the dial pulses detected by the dial pulse detecting circuitry, circuitry for detecting a first dial pulse which is generated after the dial tone has been detected, and circuitry for preventing a call when the detected dial impulse corresponds to a first dialed number which is forbidden.

More particularly, a preferred embodiment of this invention comprises a telephone set provided with a dial, a telephone exchange, circuitry for detecting a dial tone sent from the telephone exchange to the telephone set through an office line in response to an originating operation of the telephone set, circuitry connected to the office line for detecting a dial pulse which is applied to the office line when the dial of the telephone set is operated, a speech loop interruption control unit for interrupting the speech loop in response to a control signal, a dial pulse counter for counting the number of dial pulses detected by the dial pulse detecting circuitry, memory for storing the output of the dial pulse detecting means and the output of the dial pulse counter corresponding to a dial pulse generated by a first dialed digit of the dial, forbidding circuitry which produces an output only when the output of the dial pulse counter corresponds to a forbidden dial digit, logic which when supplied with the outputs of the forbidding circuitry and of the memory generates said control signal for operating the speech loop interruption control unit to interrupt the speech loop, a dial pulse train supervisor responsive to the output of the dial pulse detecting circuitry for supervising a dial pulse train, circuitry to supply the output of the dial pulse train supervisor to the logic, and a reset pulse generator responsive to the output of the logic circuit for producing a reset pulse adapted to reset the dial pulse counter and the logic.

BRIEF DESCRIPTION OF THE DRAWINGS

Further objects and advantages as well as the construction and operation of the invention can be more fully understood from the following detailed description taken in conjunction with the accompanying drawings in which:

FIG. 1 is a block diagram showing the basic construction of one embodiment of the system for controlling the transmission of a specific dial number of this invention, and FIGS. 2A and 2B, when combined, form a connection diagram showing the details of the embodiment shown in FIG. 1 as well as a modified embodiment.

DESCRIPTION OF THE PREFERRED EMBODIMENTS

Figure 2A:
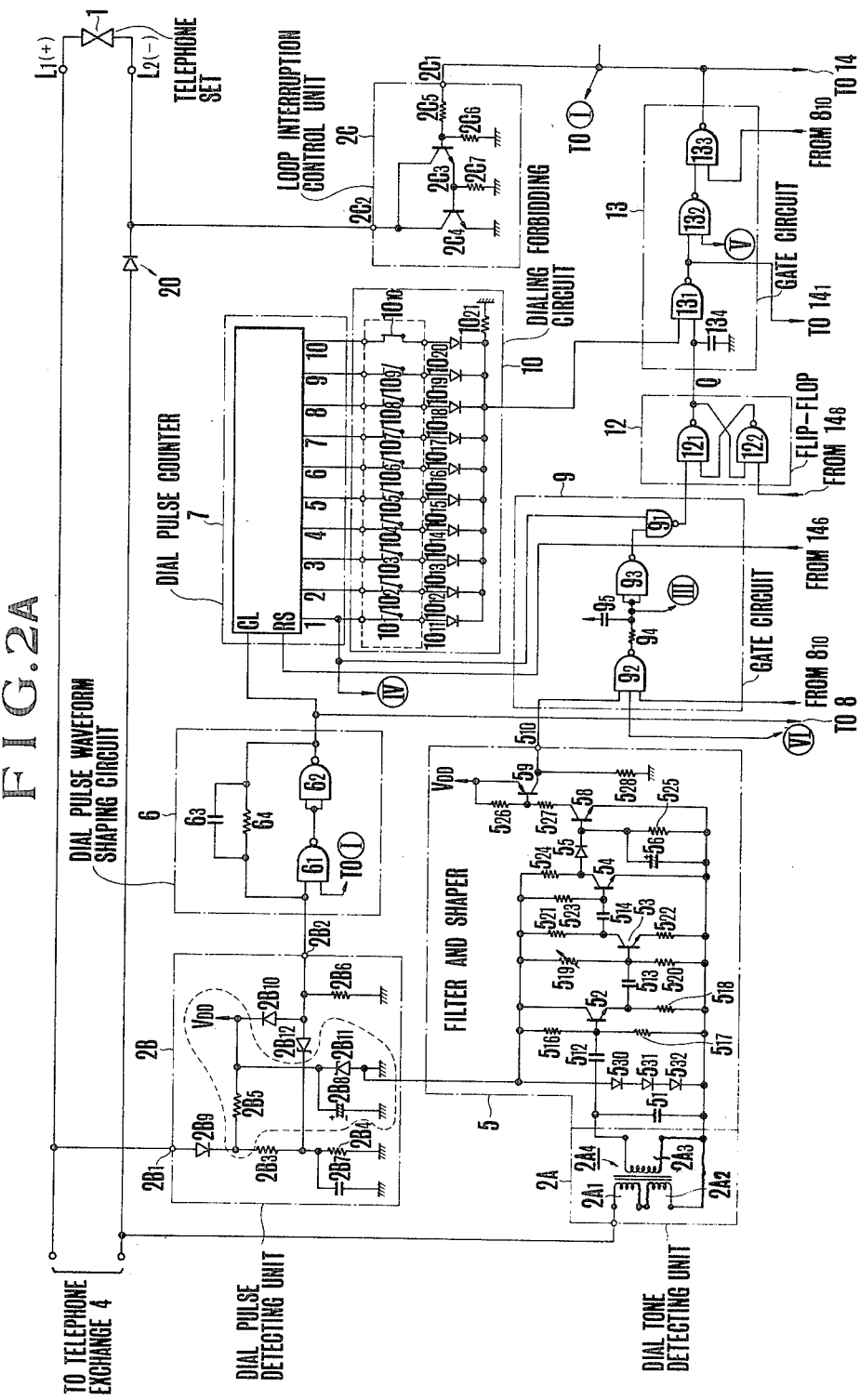

Referring first to FIG. 1 of the accompanying drawings, a telephone set 1 is connected to a telephone exchange 4 through a signal detecting and controlling circuit 2 and an office line 3. The signal detecting and controlling circuit 2 comprises a dial tone detecting unit 2A which detects the dial tone sent from the telephone exchange 4, a dial pulse detecting unit 2B which detects the dial pulse sent from the telephone set 1 and a talking or speech loop interruption control unit 2C which opens the loop when an improper operation is detected. The dial tone DT detected by the dial tone detecting unit 2A is received by a combined filter and shaper circuit 5 which is constructed to extract only the dial tone and to shape it into a pulse. This combined filter and shaper circuit 5 constitutes dial tone detecting means together with the dial tone detecting unit 2A of the signal detecting and controlling circuit 2. The dial pulse DP detected by the dial pulse detecting unit 2B is shaped by a dial pulse waveform shaping circuit 6, and the output thereof is counted by a dial pulse counter 7 which is connected to and reset by the output of a reset pulse generator 14. The dial pulse counter 7 is constructed to produce outputs on different output terminals each time a pulse is counted and, as illustrated has individual output terminals "1" through "10". The output of the dial pulse waveform shaping circuit 6 is also supplied to a dial pulse train supervisor 8, the output thereof being used to control the reset pulse generator 14.

A gate circuit 9 is provided with inputs which are connected to receive the output of the dial tone filter and shaper circuit 5 and the output of the dial pulse counter 7. The gate circuit 9 constitutes means for detecting the first dial impulse following the detection of the dial tone. There are also provided a forbidding circuit 10 including switches provided for selecting the signal at one of the output terminals of the dial pulse counter 7, a R-S flip-flop circuit 12, and a gate circuit 13 connected to receive the output of the flip-flop circuit 12 and the output of the dial pulse counter 7 via the forbidding circuit 10. The gate circuit 13 and the flip-flop circuit 12 cooperate to constitute means for forbidding talking in response to an output of the forbidding circuit 10 indicating that the dial impulses correspond to a forbidden first-dialed number. The output of the gate circuit 13 is sent to the loop interruption control unit 2C of the signal detecting and controlling circuit 2 and to the reset pulse generator 14.

The embodiment shown in FIG. 1 operates in the following manner. When a loop circuit of the telephone set is closed after its handset has been off-hooked, the telephone exchange 4 transmits a dial tone until it receives the first digit dial pulse. This dial tone is applied to the gate circuit 9 as a signal having a level "1" via the dial tone detecting unit 2A of the signal detecting and controlling unit 2 and the combined filtering and waveform shaping circuit 5. Then, when the subscriber, that is the originator, dials, the dial pulse is detected by the dial pulse detecting unit 2B of the signal detecting and controlling circuit 2; and the output of the dial pulse detecting unit is shaped by the dial pulse waveform shaping circuit 6 and then sent to the dial pulse counter 7 and to the dial pulse train supervisor 8 which indicates that a train of pulses corresponding to one digit is being sent.

When supplied with the dial pulse from the dial pulse waveform shaping circuit 6, the dial pulse counter 7 produces an output on its "1" output terminal in response to the first pulse, thus applying a signal at level "1" to the gate circuit 9. Consequently, when the dial is operated while a dial tone is being received, the R-S flip-flop circuit 9 will be set by the output of the gate circuit 9. At this time, if the dialed number (digit) were the forbidden number (in this example, the forbidden number is "0", showing that 10 pulses are sent out), the output of the R-S flip-flop circuit 12 and the output at output terminal "10" of the dial pulse counter 7 would be applied to the gate circuit 13. The output of this gate circuit is applied to the loop interruption control unit 2C of the signal detecting and controlling circuit 2 for opening the talking loop. In this manner, it is possible to positively prevent improper use of the telephone to make a toll call, for example. At the same time, the output of the gate circuit 13 is applied to the reset pulse generator 14 to reset the dial pulse counter 7 and the R-S flip-flop circuit 12 by the reset pulse generated by the reset pulse generator.

Where the dialed number is not the forbidden number (in this example digits 1 through 9), the output on the "10" output terminal of the dial pulse counter 7 would not be applied to the input of the gate circuit 13 via the forbidding circuit 10 so that the talking will not be interrupted. When dial pulses corresponding to one digit have been sent out, the dial pulse train supervisor 8 controls the reset pulse generator 14 so as to reset the R-S flip-flop circuit 12 and the dial pulse counter 7.

Figure 2B:
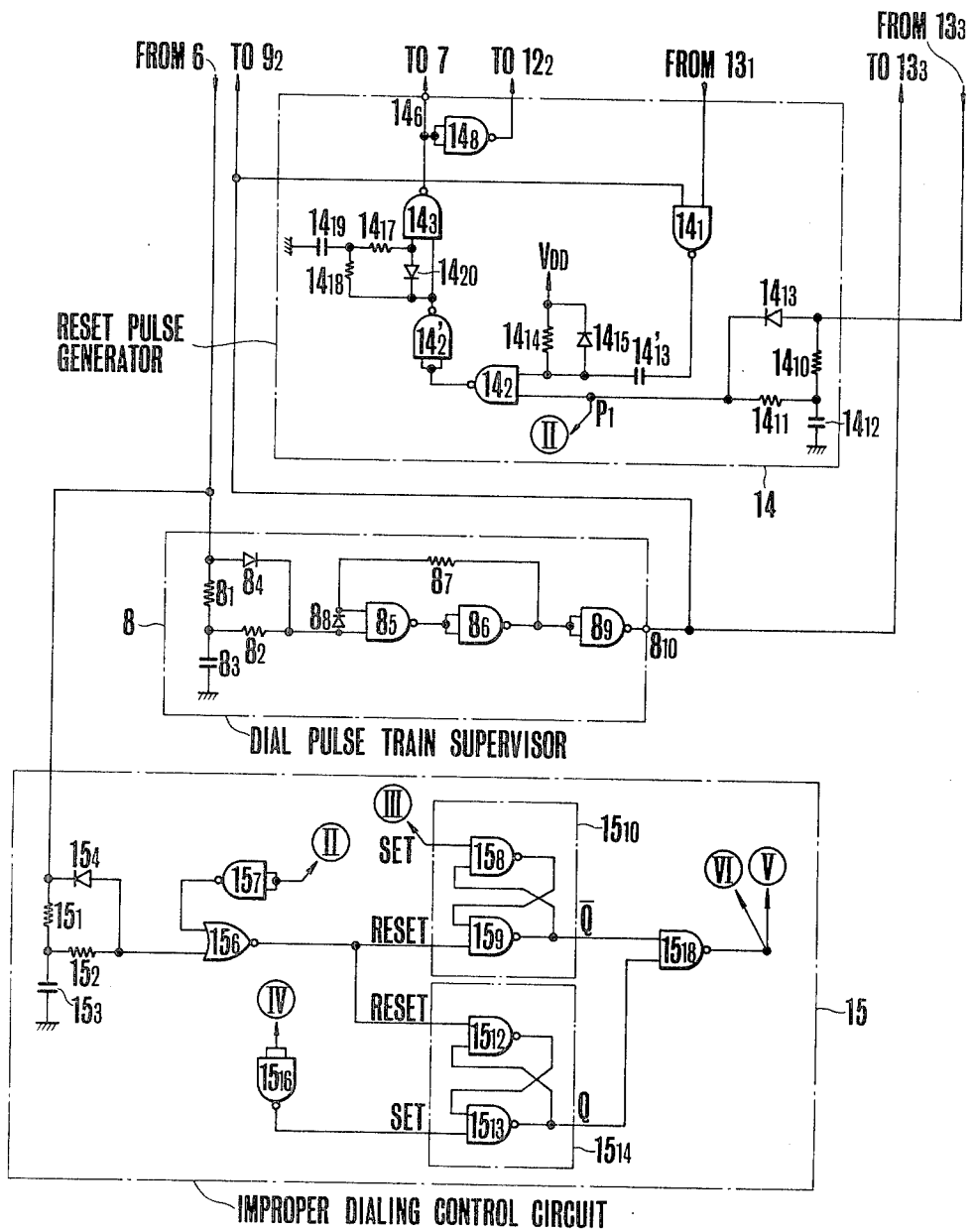

Now, with reference to FIGS. 2A and 2B, the detail of the circuit construction and operation of the embodiment shown in FIG. 1 will be described hereunder. In FIGS. 2A and 2B elements bounded by dot and dash lines correspond to those shown in FIG. 1 and are designated by the same reference characters. As shown, the dial tone detecting unit 2A comprises a transformer $2A_4$ with its primary windings $2A_1$ and $2A_2$ connected to the telephone exchange 4 via office lines, and its secondary winding connected to the dial tone filtering and shaping circuit 5. As will be described hereinafter, secondary winding $2A_3$ cooperates with a capacitor for extracting only the dial tone component sent from the telephone exchange 4. The dial tone may be a signal having a frequency of 400 Hz, for example.

The input terminal $2B_1$ of the dial pulse detecting unit 2B is connected to the telephone set 1, while the output terminal $2B_2$ is connected to the dial pulse waveform shaping circuit 6. The dial pulse detecting unit 2B is constructed to detect the dial pulse produced by the dialing operation of the subscriber by means of diodes. The dial pulse detecting unit 2B is constituted by resistors $2B_3$ through $2B_6$, capacitors $2B_7$ and $2B_8$, diodes $2B_9$ and $2B_{10}$ and Zener diodes $2B_{11}$ and $2B_{12}$. When the subscriber does not originate a call, a voltage of +48 V (with reference to line $L_2$) is applied to line $L_1$ of the telephone line which interconnects the telephone exchange 4 and the telephone set 1. As a consequence, the capacitor $2B_8$ of the dial pulse detecting unit 2B is normally charged to a predetermined voltage $V_{DD}$ via input terminal $2B_1$, diode $2B_9$ provided for the purpose of preventing reverse flow, and resistor $2B_5$ having a large value. The elements of the dial pulse detecting unit 2B enclosed by dotted lines constitute a source circuit, one of the feature of this invention. At the same time, capacitor $2B_8$ is also charged through high resistance resistor $2B_5$. The values of resistors $2B_3$ and $2B_4$ are selected to have large enough values to prevent the operation of a relay adapted to detect the closed condition of the loop when the handset is on-hook. When the handset is on-hook, the output terminal $2B_2$ is maintained at a high level, whereas when the handset is off-hook, a load is connected across the telephone circuit so that the voltage of the output terminal $2B_2$ decreases whereby a low level signal is applied to the dial pulse waveform shaping circuit 6. The voltage level of the output terminal is caused to alternate between the high and low levels by the dial pulses produced by the subsequent operation of the dial.

The input terminal $2C_1$ of the loop interruption control unit 2C is connected to the output of a NAND gate circuit comprising the gate circuit 13, whereas the output terminal $2C_2$ of the loop interruption control circuit 2C is connected to the telephone set 1 so as to open the talking loop thereof by the outputs of Darlington connected transistors $2C_3$ and $2C_4$ which are connected to be driven by the output of the gate circuit 13. The loop interruption control unit 2C further comprises resistors $2C_5$, $2C_6$ and $2C_7$ which are connected as shown. Transistors $2C_3$ and $2C_4$ are normally maintained in the ON state by a high level output of the gate circuit 13. When the output of the gate circuit 13 becomes a low level, transistors $2C_3$ and $2C_4$ are turned OFF to interrupt the talking loop.

The dial tone filtering and shaping circuit 5 comprises a capacitor $5_1$ which is connected in parallel with the secondary winding 2A of transformer $2A_4$ of the dial tone detecting unit 2A. The capacitor $5_1$ and the secondary winding 2A constitute a filter circuit for extracting the dial tone. The input side of a transistor $5_2$ which constitutes an emitter follower type buffer amplifier is connected in parallel with the capacitor $5_1$. To the emitter electrode of transistor $5_2$ are connected transistors $5_3$ and $5_4$ which are connected in cascade to form an inverting amplifier. The collector output of transistor $5_4$ is converted into direct current, that is the waveform of the collector output is shaped and thereafter the level of the direct current is shifted by transistors $5_8$ and $5_9$ and finally arrives at an output terminal $5_{10}$. The filtering and waveform shaping circuit 5 further comprises capacitors $5_{12}$ through $5_{14}$, resistors $5_{16}$ through $5_{28}$ and serially connected diodes $5_{31}$ through $5_{32}$ which are used to apply constant voltages to transistors $5_2$, $5_3$ and $5_4$. Consequently, when the dial tone is extracted from the output of the dial tone detecting unit 2A by the dial tone filtering and shaping circuit 5, the extracted dial tone is amplified by transistors $5_2$ through $5_4$ and then the waveform of the dial tone is shaped by diode $5_5$ and capacitor $5_6$, thereby producing a high level DC output on the output terminal $5_{10}$. This output is sent to the gate circuit 9.

The dial pulse waveform shaping circuit 6 comprises cascade connected NAND gate circuits 61 and 62, a capacitor 63 and a resistor 64 which are connected across the series combination of the NAND gate circuits. These elements constitute a Schmidt circuit. The waveform of the dial pulse sent from the dial pulse detecting unit 2B is shaped by the pulse waveform shaping circuit 6 and its output is applied to the dial pulse train supervisor 8 and to the input terminal CL of the dial pulse counter 7 to be counted thereby.

The pulse counter 7 may be constituted by a decade counter or a ring counter. As will be described hereinafter to one input of the NAND gate circuit $6_1$ of the dial pulse waveform shaping circuit 6 is applied the output of the gate circuit 13. This output is normally at a high level but becomes a low level when the forbidden dial number is received, thus stopping the operation of the circuit 6 and preventing the counter 7 from counting. The output of the dial pulse counter 7 is applied to one input of a NAND gate circuit $9_1$ of the gate circuit 9; and the "1" output terminal of the dial pulse counter 7 is connected to the dialing forbidding circuit 10 which comprises switches $10_1$ through $10_{10}$ and diodes $10_{11}$ through $10_{20}$ respectively connected in series with switches $10_1$ through $10_{10}$. The cathode electrodes of the diodes $10_{11}$ through $10_{20}$ are commonly connected and then connected to the ground via a resistor $10_{21}$. Only one of the switches corresponding to the dial number forbidden to use is normally closed and the other switches are opened. In this example, only switch $10_{10}$ connected to the output terminal "10" of the counter 7 is closed to prevent the transmission of the pulses corresponding to the digit or number "0" which is first dialed.

In addition to the NAND gate circuit $9_1$ described above, the gate circuit 9 further comprises NAND gate circuits $9_2$ and $9_3$, a resistor $9_4$ and a capacitor $9_5$. Resistor $9_4$ and capacitor $9_5$ operate to hold the high level state when the office lines are short circuited while the subscriber is dialing a number following the reception of a dial tone. When the dial pulse counter 7 receives a pulse corresponding to the first dialed number, an output is produced on the "1" output terminal of the counter and in response to this output and the output of the NAND gate circuit $9_3$, the NAND gate circuit $9_1$ is enabled to send a low level output to the succeeding stage.

The R-S flip-flop circuit 12 comprises two NAND gate circuits $12_1$ and $12_2$ and is reset by the output of the NAND gate circuit $9_1$ of the gate circuit 9. More particularly, when the subscriber dials in response to a dial tone, the R-S flip-flop circuit 12 is set by the pulse generated by the dial number firstly turned. The output of this flip-flop circuit is sent to the gate circuit 13 constituted by three NAND gate circuits $13_1$, $13_2$ and $13_3$ and a holding capacitor $13_4$ connected to one input of the NAND gate circuit $13_1$ which receives the output of the flip-flop circuit 12.

If the first dialed number is the forbidden one (in this example digit "0"), the output of the R-S flip-flop circuit 12 and the output of the dial pulse counter 7 are applied to the inputs of the NAND gate circuit $13_1$ of the gate circuit 13 and the loop interruption control unit 2C is actuated by the output of the NAND gate circuit 13, thus interrupting the talking loop of the telephone set. At the same time, the output of the NAND gate circuit $13_1$ is applied to the reset pulse generator 14 to reset the dial pulse counter 7 and the R-S flip-flop circuit 12. The NAND gate circuit $13_2$ of the gate circuit 13 merely operates as an inverter where an improper dialing control circuit to be described later is not provided.

To one input of the NAND gate circuit $13_1$ of the gate circuit 13 is applied the Q output of the flip-flop circuit 12 which has been set by the output produced by the dial pulse counter 7 when it receives a pulse corresponding to the firstly turned dial number. The other input of the NAND gate circuit $13_1$ is supplied with the output of the dialing forbidding circuit 10 which is produced by the circuit 10 when it receives a pulse corresponding to the forbidden dial number.

When the firstly turned dial number is the forbidden number or digit, both inputs to the NAND gate circuit $13_1$ are at the high level so that this NAND gate circuit will produce a low level output. Accordingly, the NAND gate circuit $13_2$ produces a high level output. When the signal appearing at the output terminal $8_{10}$ of the pulse train supervisor 8 returns to the high level from the low level, the output of the NAND gate circuit $13_3$ becomes low level, and this output is sent to the loop interruption control unit 2C to open the loop. The output of the NAND gate circuit $13_3$ is also sent to the reset pulse generator 14 to reset the dial pulse counter 7 and the R-S flip-flop circuit 12 in a manner to be described hereunder, thus returning to the original off-hook state.

When the firstly turned dial number is not the forbidden digit, the NAND gate circuit $13_1$ will not be supplied with the output of the dialing forbidding circuit 10 so that the NAND gate circuit $13_1$ will produce a high level output. Consequently, the NAND gate circuit $13_2$ will produce a low level output, and the NAND gate circuit $13_3$ produces a high level output with the result that the loop interruption control unit 2C would not be operated. Thereafter, a normal origination operation is performed between the telephone exchange 4 and the originating telephone set 1. When the second digit is dialed, the telephone exchange 4 does not transmit the dial tone signal. Thus, the output of the NAND gate circuit $9_3$ of the gate circuit 9 becomes the low level, and each time a dial number is subsequently turned the dial pulse counter 7 counts the number of the dial pulses; and the output of the NAND gate circuit $9_1$ remains at the high level even when the counter 7 produces its output on "1" output terminal. For this reason, the flip-flop circuit 12 will be maintained in the reset state and its Q output is at the low level. Thus, the output of the NAND gate circuit $13_1$ is maintained at the high level.

The dial pulse train supervisor 8 includes a timer made up of resistors $8_1$ and $8_2$, a capacitor $8_3$ and a diode $8_4$ and functions to detect the termination of a dial pulse train. The operating time of the timer is about 150 ms which is sufficient to discharge the electric charge stored in the capacitor $8_3$. The dial pulse train supervisor further comprises NAND gate circuits $8_5$ and $8_6$, a resistor $8_7$ and a diode $8_8$ which constitute circuit is sent out to an output terminal $8_{10}$ via a NAND gate circuit $8_9$ acting as an inverter. The output appearing at the output terminal $8_{10}$ is applied to one input of the NAND gate circuit $13_3$ of the gate circuit 13, to one input of the NAND gate circuit $9_2$ of the gate circuit 9 and to one input of the NAND gate circuit $14_1$ of the reset pulse generator 14.

Normally, the pulse train supervisor 8 receives a high level signal from the dial pulse detecting unit 2B via the dial pulse waveform shaping circuit 6, but this changes to a low level after the handset has been taken off the hook. When supplied with a dial pulse from the shaping circuit 6, the capacitor $8_3$ of the dial pulse train supervisor is charged by the dial pulse. The input side of the NAND gate circuit $8_9$ is normally at the low level and the output thereof is at the high level. The output of the NAND gate circuit $8_9$ becomes a low level when the capacitor $8_3$ is charged by the dial pulse, and returns to the original high level about 150 ms after termination of the dialing operation.

The reset pulse generator 14 comprises the above described NAND gate circuit $14_1$ with its input connected to receive the output of the gate circuit 13 and the output of the dial pulse train supervisor 8, and a plurality of NAND gate circuits $14_2$, $14_3$ and $14_5$ connected in series with NAND gate circuits $14_1$, and the output terminal $14_6$ of the reset pulse generator 14 is connected to the reset terminal RS of the dial pulse counter 7 for resetting the same and to the R-S flip-flop circuit 12 via a NAND gate circuit $14_8$ which acts as an inverter for resetting the flip-flop circuit. Resistors $14_{10}$ and $14_{11}$, capacitor $14_{12}$ and a diode $14_{13}$ constitute a timer which causes the input to the NAND gate circuit $14_2$ to go to a low level a definite time (about 2 seconds) after a low level output has been produced by the NAND gate circuit $13_1$. The NAND gate circuit 14 produces a low level output when it receives the high level output from the dial pulse train supervisor 8 and the high level output from the NAND gate circuit $13_1$ when it is supplied with a pulse corresponding to a firstly turned dial number which is forbidden. The output of the NAND gate circuit $14_1$ is applied to one input of the NAND gate circuit $14_2$ via a differentiating circuit made up of a capacitor $14'_{13}$, a resistor $14_{14}$ and a diode $14_{15}$, and the output of the NAND gate circuit $14_2$ is applied to NAND gate circuit $14'_2$ acting as an inverter. The output of the NAND gate circuit $14'_2$ is applied directly to one input of the NAND gate circuit $14_3$ and to the other input thereof through a timer constituted by resistors $14_{17}$ and $14_{18}$, a capacitor $14_{19}$ and a diode $14_{20}$. The purpose of this timer is to determine the reset time of counter 7, and its operating time is set to about 10 ms. With this connection, the output terminal $14_6$ of the reset pulse generator 14 is normally at a low level because the outputs of the NAND gate circuits $14_1$ and $13_3$ are at the high level and hence the output of the NAND gate circuit $14_2$ is at the low level.

Where the firstly turned dial number is the forbidden number, the output of the gate circuit 13 is at the low level; and after about four seconds, the input to the NAND gate circuit $14_2$ becomes the low level while the output of the NAND gate circuit $14_2$ becomes the high level. Accordingly, a high level signal appears at the output terminal $14_6$ of the reset pulse generator thereby resetting the dial pulse counter 7 and the flip-flop circuit 12.

A diode 20 connected in series with the telephone line is provided for the following purpose. Thus, under normal origination state, a voltage which makes positive the line $L_1$ and negative the line $L_2$ is impressed across the telephone line. Accordingly, the control system of this invention can operate. Where dialing is not forbidden and when a normal dialing operation is performed and the called party responds, the polarities of the lines $L_1$ and $L_2$ are reversed. Then, the gate circuit 13 and the transistors in the loop interruption control unit 2C are reversely biased with the result that transistors $2C_3$ and $2C_4$ of the control unit might be destroyed. Moreover, no talking loop is formed. Diode 20 acts to bypass such reverse bias for protecting the transistors and to ensure the talking path.

At the time of paging, where the polarity of the lines are reversed, this diode functions in the same manner.

Since FIGS. 2A and 2B show only one example of this invention, it will be clear that the dial tone detecting unit 2A, the dial pulse detecting unit 2B and the loop interruption control unit 2C may have different constructions. Further, the constructions of the dial tone filtering and shaping circuit 5, the dial pulse waveform shaping circuit 6 and the gate circuits 9 and may be different from those shown in FIGS. 2A and 2B. In FIG. 2B, an improper dialing control circuit 15 has been added. This control circuit includes a timer, that is an integrating circuit constituted by resistors $15_1$ and $15_2$, a capacitor $15_3$, and a diode $15_4$. The operating time of the timer is set to about 150 ms so as to discriminate between a dial pulse and a signal generated by an off-hook operation of the handset. More particularly, at the time of dialing and when a high level dial signal is applied to one input of a NOR gate circuit $15_6$, the flip-flop circuits $15_{10}$ and $15_4$ might be reset even though they have been previously set, in other words even when signal DT has been confirmed. The timer discriminates between these conditions. The output of the timer is applied to one input of the NOR gate circuit $15_6$ and the other input thereof is connected to one input $P_1$ of the NAND gate circuit $14_2$ of the reset pulse generator 14 via NAND gate circuit $15_7$ acting as an inverter.

The output of the NAND gate circuit 15 is applied to the reset terminal of a flip-flop circuit $15_{10}$ constituted by two NAND gate circuits $15_8$ and $15_9$ and to the reset terminal of a flip-flop circuit $15_{14}$ also constituted by two NAND gate circuits $15_{12}$ and $15_{13}$. Flip-flops $15_{10}$ and $15_{14}$ constitute a memory circuit. The set terminal of the flip-flop circuit $15_{10}$ is connected to one input of the NAND gate circuit $9_3$ of the gate circuit 9, and the set terminal of the flip-flop circuit $15_{14}$ is connected to the output terminal "1" of the dial pulse counter 7 via a NAND gate circuit $15_{16}$ acting as an inverter.

The $\overline{Q}$ outputs of the flip-flop circuits $15_{10}$ and $Q_{14}$ are connected to the inputs of a NAND gate circuit $15_{18}$, and the output thereof is connected to the one input of the NAND gate circuit $13_2$ of the gate circuit 13 and to one input of the NAND gate circuit $9_2$ of the gate circuit 9.

When the handset of the telephone set 1 is on-hook, the respective flip-flop circuits of the improper dialing control circuit 15 are in their reset state and the output of the NAND gate circuit $15_{18}$ is at a low level. Furthermore, at this time, since the output of the dial pulse waveform shaping circuit 60 is at a high level, the capacitor $15_3$ is charged.

Then, when the handset is taken off the hook the charge of the capacitor $15_3$ discharges through diode $15_4$ so that the input of the NOR gate circuit $15_6$ immediately becomes low thus changing its output to the high level.

When the telephone exchange 4 produces a dial tone in response to an off-hook condition, the dial tone is detected by the dial tone detecting unit 2A to produce a dial tone signal. Then a trigger pulse is applied to the input of the NAND gate circuit $9_3$ of the gate circuit 9 for setting the flip-flop circuit $15_{10}$ of the improper dialing control circuit 15. Accordingly, the $\overline{Q}$ output of this flip-flop circuit becomes a low level to enable NAND gate circuit $15_{18}$ with the result that the output of the NAND gate circuit $15_{18}$ becomes the high level. Consequently, the NAND gate circuit $9_2$ of the gate circuit 9 and the NAND gate circuit $13_2$ of the gate circuit 13 which are supplied with the output of the NAND gate circuit $15_{18}$ are enabled or disabled depending upon the level of the signals applied to their other outputs. In other words, this state shows that the next operation, that is the dialing operation of the subscriber may be commenced.

On the other hand, when the dial tone signal is not generated, flip-flop circuit $15_{10}$ is in its reset state and its $\overline{Q}$ output is maintained at the high level. Accordingly, when the subscriber dials under these conditions, the dial pulse detected by the dial pulse detecting unit 2B is applied to the dial pulse counter 7 via the dial pulse waveform shaping circuit 6, and the "1" output of the counter 7 is applied to the flip-flop circuit $15_{16}$ of the improper dialing control circuit 15 through NAND gate circuit $15_{16}$ thereof, thus setting the flip-flop circuit $15_{14}$ with the result that its output changes to the high level from the low level. Consequently, both inputs to the NAND gate circuit $15_{18}$ become the high level to change its output to the low level. This output of the NAND gate circuit $15_{18}$ is applied to the NAND gate circuit $13_2$ of the gate circuit 13, so that the output of this NAND gate circuit becomes high level. For this reason, when the dialing operation is completed and the output of the dial pulse train supervisor becomes the high level, transistors $2C_3$ and $2C_4$ of the loop interruption control unit 2C are turned OFF so as to open the loop. About 2 seconds after interruption the loop, the low level signal is applied to the NAND gate circuit $15_7$ from the reset pulse generator 14 to change the output of the NOR gate circuit $15_6$ to the low level, thus resetting the flip-flop circuits $15_{10}$ and $15_{14}$. This is the initial on-hook condition.

As described above, when the improper dialing control circuit 15 is provided, until the telephone exchange 4 transmits a dial tone in response to a call origination, any dialing operation causes the talking circuit to be interrupted even when the subscriber properly dials, and thus only proper signals are sent to the telephone exchange. In this manner, it is possible to positively prevent an improper connection when the dial is not properly operated.

While the invention has been shown and described in terms of a preferred embodiment thereof it will be clear that the invention is by no means limited thereto and that many changes and modifications will occur to one skilled in the art without departing from the true spirit and scope of the invention as defined in the appending claims.

What is claimed is:

1. A system for controlling the transmission of a specific dial number from a telephone set provided with a dial to a telephone exchange, the system comprising: means for detecting a dial tone sent from said telephone exchange to said telephone set through an office line in response to an originating operation of said telephone set; dial pulse detecting means connected to said office line for detecting dial pulses which are applied to said office line when the dial of said telephone set is operated and for producing output signals respresentative thereof; a talking loop interruption control unit for interrupting the telephone talking loop in response to a control signal; a dial pulse counter, responsive to the dial pulse means output signals, for counting the number of dial pulses detected by said pulse detecting means and for providing output signals representative thereof; memory means, responsive to the output of said dial tone detecting means and an output signal from said dial pulse counter representative of the first dial pulse generated by a firstly turned digit of said dial, for providing an output signal only when said firstly turned digit is dialed after a dial tone has been sent from said telephone exchange; selection means which produces an output only when the output of said dial pulse counter corresponds to a forbidden dial digit; logic circuit means, responsive to outputs from said selection means and from said memory means, for producing said control signal for operating said talking loop interruption control unit to interrupt said talking loop when said firstly turned digit corresponds to the forbidden digit or when said firstly dialed digit is dialed before the dial tone is sent from said telephone exchange; a dial pulse train supervisor responsive to the output of said dial pulse detecting means for supervising a dial pulse train; means to supply the output of said dial pulse train supervisor to said logic circuit means; and a reset pulse generator, responsive to the control signal from said logic circuit means, for producing a reset pulse to reset said dial pulse counter and said memory means a predetermined time after the production of said control signal by said logic circuit means.

2. The control system according to claim 1 wherein said dial tone detecting means and said loop interruption control unit are connected in series with the telephone talking loop;

and wherein a diode is connected in parallel with said serially-connected dial tone detecting means and loop interruption control unit with a polarity opposite to the polarity of the voltage applied by said telephone exchange to the telephone set when the telephone set originates a call;

said loop interruption control unit and said diode being operative to open said telephone loop in response to said control signal.

3. The control system according to claim 1 which further comprises a gate circuit connected between said dial pulse detecting means and said dial pulse counting means operative in response to the control signal from said logic circuit means to prevent said counter from being clocked by dial pulses.

4. The control system according to claim 1 wherein said reset pulse generator comprises a timer which produces a reset pulse a predetermined time after transmission of the control signal from said logic circuit so that said loop is interrupted for the predetermined time after which said loop is reconnected.

5. The control system according to claim 2 wherein said dial pulse counter comprises a plurality of output terminals respectively corresponding to respective digits of the dial and said selection means comprises a plurality of switches respectively connected to the output terminals of said dial pulse counter, the one of the switches corresponding to a specific digit of the dial which is forbidden being normally closed.

6. The control circuit according to claim 5 wherein said logic circuit means comprises a NAND gate circuit having one input connected to the output of said selection means and the other input connected to the output of said dial tone detecting means through a flip-flop circuits.

7. The control circuit according to claim 6 wherein said logic circuit means further comprises another NAND gate circuit with one input connected to the output of said first mentioned NAND gate circuit and the other input connected to the output of said dial pulse train supervisor, and means for applying the output of said another NAND gate circuit to said reset pulse generator and said loop interruption control unit.

8. The system of claim 1 wherein said memory means comprises:

a flip-flop having two output states;

means for applying said reset pulse to said flip-flop for setting said flip-flop to a first output state;

first gate means responsive to the dial tone detecting means and to the dial pulse train supervisor for providing an output signal in response to the presence of a dial tone while no digit is being dialed;

time constant means connected to the gate means for maintaining the gate means output signal as a digit is dialed; and second gate means, responsive to an output signal from the dial pulse counter representative of the first dial pulse of a firstly-turned digit and to the first gate means output signal maintained by said time constant means, for setting said flip-flop to a second output state in response to a firstly-dialed digit dialed after said dial tone.

9. The system of claim 2 wherein the loop interruption control unit includes a semiconductor device operative in the absence of said control signal to provide a conduction path of opposite polarity to that provided by said diode.

* * * * *